Sept. 5, 1967  H. DAVIS ETAL  3,340,112
METHOD OF MAKING MULTI-CONDUCTOR TELEPHONE
CABLES WITH AXIALLY SPACED WATER BARRIERS
Filed Jan. 27, 1964
2 Sheets-Sheet 1
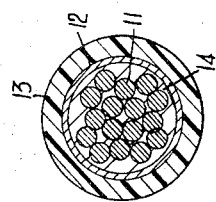
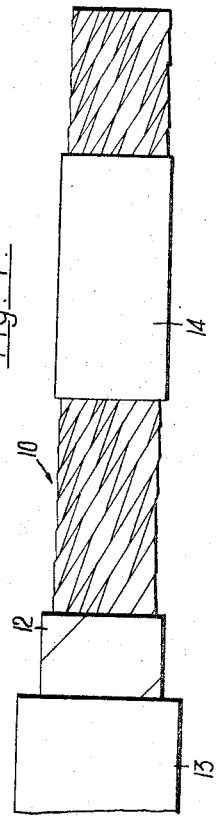

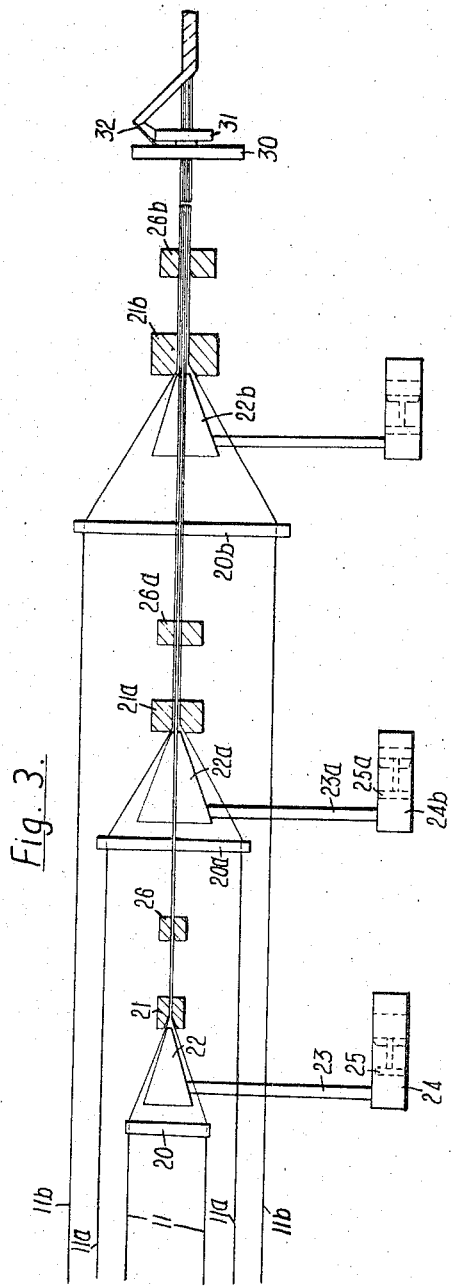

3,340,112
METHOD OF MAKING MULTI-CONDUCTOR TELEPHONE CABLES WITH AXIALLY SPACED WATER BARRIERS
Henry Davis, London, and Henry John Fisher, Epping, Essex, England, assignors to Reliance (Cords & Cables) Limited, London, England, a company of Great Britain
Filed Jan. 27, 1964, Ser. No. 340,228
Claims priority, application Great Britain, Feb. 4, 1963, 4,555/63
15 Claims. (Cl. 156—47)

This invention concerns multi-conductor telephone cables.

Telephone cables comprising conductors insulated with a water-impermeable synthetic resin material, such as polythene, are to be preferred to cables with paper insulated conductors because, if water enters the outer sheath of the cable, failures will be restricted to those circuits where a pin hole occurs in the synthetic resin insulant. Although, however, the said circuits may remain operative, the smooth surface of the synthetic resin insulant permits water to travel freely through the interstices between the conductors. The presence of water in these interstices is, however, objectionable because the mutual capacitance between adjacent conductors will be altered in such a way as substantially to impair the signal transmission characteristics of the cable. Moreover, it is extremely difficult to extract the water from the cable and this is particularly the case if the cable has become flooded for a considerable distance.

According, therefore, to the present invention there is provided a method of forming a multi-conductor telephone cable with a series of axially spaced water barriers, comprising the steps of making a plurality of conductors, each of which is individually covered throughout its length with a water-impermeable insulating covering, into a telephone cable, and, during the making of the telephone cable, introducing water-impermeable material into the telephone cable in a series of predetermined axially spaced apart regions thereof, the water-impermeable material displacing the air from and filling interstices between the conductors in the said regions, the total volume of water-impermeable material introduced into the said interstices in substitution for the air therein increasing the mutual capacitance between the conductors of the whole telephone cable by less than 10%.

Preferably the total volume of water-impermeable material is such that it does not increase the said mutual capacitance by more than 1%.

It may be arranged that the total volume of water impermeable material in the cable is less than 4% of the total volume of the cable.

It will be appreciated that the said water barriers may be so spaced as to prevent any water which has entered the cable from passing along any substantial length of the cable. Thus the arrangement may be such that even a complete flooding of a length of cable between two adjacent water barriers would only increase the mutual capacitance between the conductors to such a small degree that the signals transmitted by the cable are not attenuated to an undesirable extent.

It will also be appreciated that, since the water barriers will limit the axial extent to which the cable can be flooded, the number of circuits which will be rendered inoperative due to a pin hole in the synthetic resin insulant will be very much reduced.

The water-impermeable material may be intermittently introduced into the cable during the stranding together of a group of the conductors of the cable.

The said stranded together group may be formed by passing a plurality of conductors, or stranded together assemblies of conductors, through a common die, and intermittently injecting the water-impermeable material into the said stranded together group or assemblies upstream of said die, whereby as the conductors, or assemblies of conductors, pass through the die the water-impermeable material is forced by the die into all of said interstices.

Over and around the stranded group of conductors so formed, there may be stranded further conductors, or further groups of conductors, at a further die, further water-impermeable material being intermittently injected into the said further conductors or further groups of conductors upstream of said further die, the arrangement being such that the further water-impermeable material will be substantially aligned with the first-mentioned water-impermeable material.

The stranded together group of conductors may be covered with a water-impermeable cover. Thus the latter may be a paper wrapping, and the water-impermeable material may be such as to soak into the paper so as to render the latter waterproof. Alternatively, the water-impermeable cover may be of polythene.

The cable is preferably provided with an outer sheath of a thermoplastic synthetic resin material such, for example, as polythene. During the application of the outer sheath a vacuum may be maintained within it so that it grips the conductors tightly.

One suitable water-impermeable material is a natural or synthetic wax (e.g. a micro-crystalline wax) which may, if desired, be mixed with organic or inorganic plasticising agents.

Alternatively, the water-impermeable material may be constituted by a synthetic resin material (e.g. polyurethane) which is foamed in situ.

Other water-impermeable materials which may be used are elastomeric materials, such, for example as polyisobutylene; hydrophobic petroleum jellies such as that sold under the registered trademark "Vaseline"; mixtures of synthetic resin materials such, for example, as a mixture of an epoxy resin and of a liquid polysulphide; and thermoplastic synthetic resin materials, such, for example, as polythene.

One water-impermeable material which is especially useful is that sold under the trade name "D.N.D.," this being constituted by a glyceride oil loaded with an inert fibrous filler.

The invention is illustrated, merely by way of example, in the accompanying drawings in which:

FIGURE 1 is a side view of a telephone cable made in accordance with the method of the present invention, parts of the cable being stripped away so as to reveal the construction of the cable, FIGURE 2 is a cross-section of the cable shown in FIGURE 1, and FIGURE 3 illustrates the manufacture of a cable in accordance with the present invention.

Referring first to FIGURES 1 and 2, a multi-conductor telephone cable 10 comprises a plurality of conductors 11 each of which is insulated through its length by an individual covering (not shown) of a water-impermeable thermoplastic synthetic resin material such, for example, as polythene. Although the conductors 11 are shown as single conductors each conductor 11 might, in fact, be constituted by a pair or a multiplicity of conductors which have been stranded together.

The conductors 11 are covered by a paper wrapping 12 which is applied helically about the assembly of conductors 11, the paper wrapping 12 being disposed within an outer sheath 13 of polythene or other thermoplastic synthetic resin material. During the application of the outer sheath 13, a vacuum is maintained within it so that it grips the assembly of conductors 11 tightly.

The cable 10 is provided during its manufacture with a series of water barriers 14 which are axially spaced from each other. The total volume of the water barriers 14 may be less than 4% (or even less than 1%) of that of the cable 10. Thus each water barrier 14 may, for example, extend axially for six inches, the water barriers 14 being axially spaced from each other by twenty yard intervals.

Each of the water barriers 14 is constituted by water-impermeable material (which may, for example, be a micro-crystalline wax). The water-impermeable material is introduced into the cable in of each of the barriers 14 in such a way as completely to surround all the conductors 11 in the region of the respective water barrier and so as to displace the air from and to fill all the interstices between the conductors 11 in the said region.

The introduction of the water barriers 14 into the cable preferably does not increase the mutual capacitance between the conductors 11 of the whole cable by more than 1%. The said water-impermeable material moreover soaks into the paper of the wrapping 12 so as to waterproof the latter.

If water enters a cable of the kind shown in FIGS. 1 and 2, then its axial passage along the cable will be limited by the two water barriers 14 adjacent the point at which the water enters. Provided therefore there is no pinholes in any of the conductors 11 in the region between the said two water barriers 14, no action need be taken in the flooding of such a short length of cable since this will not substantially affect the mutual capacitance between the conductors 11 and hence the transmission characteristics of the cable.

Reference will now be made to FIGURE 3 which shows one particular method by means of which the water barriers 14 may be introduced into the cable during its manufacture.

Referring to FIGURE 3, a plurality of polythene insulated conductors 11 are drawn by a capstan (not shown) through holes in and adjacent the periphery of a disc-shaped die plate 20. Although, for ease of illustration, only two conductors 11 are shown, the die-plate 20 may readily be provided with a large number of angularly spaced apart holes to take a corresponding number of conductors 11. Moreover, each conductor 11 is not necessarily constituted by a single conductor but may be constituted by stranded together assemblies of conductors.

The conductors 11 which have passed through the die plate 20 are passed through a closing die 21. Immediately upstream of the closing die 21 there is mounted a feed nozzle 22 which is disposed radially inwardly of the conductors 11 proceeding from the die plate 20.

The feed nozzle 22 is connected by a pipe 23 to a cylinder 24 which is adapted to contain the water-impermeable material used in the formation of the water barriers 14. The cylinder 24 contains a piston 25 which may be moved (e.g. by pneumatic or hydraulic means, or by a revolving screw not shown) so as intermittently to force the water-impermeable material out of the cylinder 24 and through the pipe 23 so as to pass out through the feed nozzle 22. The water-impermeable material so injected into the cable is forced by the closing die 21 into all of the interstices between the conductors 11.

The conductors 11 are then drawn by the said capstan through a pressure die 26 which further contracts the assembly of conductors 11 radially towards each other and thus spreads any surplus water-impermeable material axially of the cable.

The conductors 11 then pass through the centre of a second die plate 20a which is provided adjacent its periphery with a series of angularly spaced apart holes through which are drawn further conductors, or assemblies of conductors 11a. The conductors 11, 11a are then drawn through a closing die 21a which is arranged immediately downstream of a feed nozzle 22a. The feed nozzle 22a has a construction similar to that of the feed nozzle 22 and is thus provided with a pipe 23a, cylinder 24a and piston 25a.

The conductors 11 pass through the centre of the feed nozzle 22a while the conductors 11a pass externally of the feed nozzle 22a. Further water-impermeable material is intermittently injected through the nozzle 22a into the annular region occupied by the conductors 11a. The passage of the whole assembly of conductors 11, 11a through the closing die 21a will ensure that the water-impermeable material enters all the interstices in the said annular region.

The arrangement is such that the annular region of the cable into which the water-impermeable material is injected by the feed nozzle 22a is axially aligned with the central region of the cable into which water-impermeable material has been injected by the feed nozzle 22. This, of course, may readily be effected by appropriate timing of the stopping and starting of the pistons 25, 25a.

After passage through a pressure die 26a, the conductors 11, 11a pass through the centre of a die plate 20b, while yet further conductors 11b pass through a series of angularly spaced apart holes in and adjacent the periphery of the die plate 20b. The conductors 11, 11a, 11b, on the downstream side of the die plate 20b are passed through or about a feed nozzle 22b, through a closing die 21b, and through a pressure die 26b. Here again the annular region of the cable into which the water-impermeable material is injected by the feed nozzle 22b is arranged to be axially aligned with the regions of the cable into which water-impermeable material has been injected through the feed nozzles 22, 22a.

The axial alignment of the said regions prevents any water which has entered the cable from following a sinuous path through the cable.

It will be appreciated that a cable according to the present invention having any desired number of conductors stranded togther may be manufactured by providing an appropriate number of such die plates, closing dies, pressure dies and feed nozzles.

After the cable has been built up in this manner it is passed through the centre of a taping head 30 which carries a roll of paper tape 31. Tape from the roll 31 travels over an arm 32 so as to be wound helically about the conductors 11, 11a, 11b, whereby to form the paper wrapping 12.

The cable so produced may then be passed through an extruding machine (not shown) where it is provided with the outer sheath 13 of polythene or other thermoplastic synthetic resin material.

The die plates 20, 20a, 20b, are stationary in the embodiment shown in FIGURE 3. These die plates could, however, if desired, be rotary in which case the pipes 23, 23a would need to extend axially of their feed nozzles 22, 22a.

A number of cables may be made by the method described above and may then be stranded together (with their water barriers 14 radially aligned) within a common outer sheath, water-impermeable material being injected into the interstices between the cables in positions radially aligned with the positions of the water barriers.

We claim:

1. A method of forming a multi-conductor telephone cable with a series of axially spaced water barriers comprising the steps of making a plurality of conductors, each of which is individually covered throughout its length with a water-impermeable insulating covering, into a telephone cable, and, during the making of the telephone cable, introducing water-impermeable material into the telephone cable in a series of predetermined axially spaced apart regions thereof, the water-impermeable material displacing the air from and filling interstices between the conductors in the said regions, the total volume of water-impermeable material introduced into the said interstices in substitution for the air therein increasing the mutual capacitance between the conductors of the whole telephone cable by less than 10%.

2. A method of forming a multi-conductor telephone cable with a series of axially spaced water barriers comprising the steps of making a plurality of conductors, each of which is individually covered throughout its length with a water-impermeable insulating covering, into a telephone cable, and, in which, during the making of the telephone cable, introducing water-impermeable material into the telephone cable in a series of predetermined axially spaced apart regions thereof, the water-impermeable material displacing the air from and filling interstices between the conductors in the said regions, the total volume of water-impermeable material introduced into the said interstices in substitution for the air therein increasing the mutual capacitance between the conductors of the whole telephone cable by less than 1%.

3. A method of forming a multi-conductor telephone cable with a series of axially spaced water barriers comprising the steps of making a plurality of conductors, each of which is individually covered throughout its length with a water-impermeable insulating covering, into a telephone cable, and, during the making of the telephone cable, introducing water-impermeable material into the telephone cable in a series of predetermined axially spaced apart regions thereof, the water-impermeable material displacing the air from and filling interstices between the conductors in the said regions, the total volume of water-impermeable material introduced into the said interstices in substitution for the air therein increasing the mutual capacitance between the conductors of the whole telephone cable by less than 10%, the total volume of water-impermeable material in the cable being less than 4% of the total volume of the telephone cable.

4. A method of forming a multi-conductor telephone cable with a series of axially spaced water barriers comprising the steps of stranding together a plurality of conductors, each of which is individually covered throughout its length with a water-impermeable insulating covering and, during the said stranding, intermittently introducing, water-impermeable material into the telephone cable in a series of predetermined axially spaced apart regions thereof, the water-impermeable material displacing the air from and filling interstices between the conductors in the said regions, the total volume of water-impermeable material introduced into the said interstices in substitution for the air therein increasing the mutual capacitance between the conductors of the whole telephone cable by less than 10%.

5. A method of forming a multi-conductor telephone cable with a series of axially spaced water barriers comprising passing a plurality of conductors, each of which is individually covered throughout its length with a water-impermeable insulating covering, through a common die to strand them together, and intermittently introducing water-impermeable material into the stranded together group of conductors upstream of said die in a series of predetermined axially spaced apart regions of the the telephone cable, the water-impermeable material displacing the air from and filling interstices between the conductors in the said regions, and the total volume of water-impermeable material introduced into the said interstices in substitution for the air therein increasing the mutual capacitance between the conductors of the whole telephone cable by less than 10%, the water-impermeable material being forced by the die into all of said interstices.

6. The method as claimed in claim 5 in which each of the conductors is individually covered with polythene.

7. The method as claimed in claim 5 in which over and around the stranded group of conductors so formed, there are stranded further said conductors, at a further die and further water-impermeable material is intermittently injected into the said further conductors upstream of said further die, the further water-impermeable material being substantially aligned with the first-mentioned water-impermeable material.

8. A method of forming a multi-conductor telephone cable with a series of axially spaced water barriers, comprising passing a plurality of conductors, each of which is individually covered throughout its length with a water-impermeable insulating covering, through a common die to strand them together intermittently, introducing water-impermeable material into the stranded together group of conductors upstream of said die in a series of predetermined axially spaced apart regions of the telephone cable, the water-impermeable material displacing the air from and filling interstices between the conductors in the said regions, the total volume of water-impermeable material introduced into the said interstices in substitution for the air therein increasing the mutual capacitance between the conductors of the whole cable by less than 10%, the water-impermeable material being forced by the die into all of said interstices, and covering the stranded together group of conductors with a water-impermeable cover.

9. The method as claimed in claim 8 in which the water-impermeable cover is a paper wrapping.

10. The method claimed in claim 9 in which the water-impermeable material soaks into the paper and renders the latter waterproof.

11. A method of forming a multi-conductor telephone cable with a series of axially spaced water barriers, comprising passing a plurality of conductors, each of which is individually covered throughout its length with a water-impermeable insulating covering, through a common die to strand them together, intermittently introducing water-impermeable material into the stranded together group of conductors upstream of said die in a series of predetermined axially spaced apart regions of the cable, the water-impermeable material displacing the air from and filling interstices between the conductors in the said regions, the total volume of water-impermeable material introduced into the said interstices in substitution for the air therein increasing the mutual capacitance between the conductors of the whole telephone cable by less than 10%, the water-impermeable material being forced by the die into all of said interstices, covering the stranded together group of conductors with a water-impermeable cover, and providing the telephone cable with an outer sheath of a thermoplastic synthetic resin material.

12. The method claimed in claim 11 in which the outer sheath is caused to grip the conductors tightly by maintaining a vacuum within it during its application over the conductors tightly.

13. The method as claimed in claim 11 in which the water-impermeable material is a wax.

14. The method as claimed in claim 11 in which the water-impermeable material is a glyceride oil loaded with an inert fibrous filler.

15. The method as claimed in claim 11 in which the water-impermeable material is a synthetic resin material which is foamed in situ.

References Cited

UNITED STATES PATENTS

| | | | |
|---|---|---|---|
| 382,768 | 5/1888 | Patterson | 156—38 |
| 1,774,292 | 8/1930 | Reed | 156—48 |
| 2,345,864 | 4/1944 | Arnold | 156—56 |
| 2,427,507 | 9/1947 | Powell et al. | 156—55 |
| 2,518,454 | 8/1950 | Elliott | 174—110 |
| 2,615,952 | 10/1952 | Rifenburg | 174—23 |
| 2,792,441 | 5/1957 | Platow | 174—23 |
| 3,218,207 | 11/1965 | Iafrate et al. | 156—48 |

EARL M. BERGERT, Primary Examiner.

JOHN F. BURNS, Examiner.

D. A. KETTLESTRINGS, Assistant Examiner.